US010042507B2

(12) United States Patent
Lee (10) Patent No.: US 10,042,507 B2
(45) Date of Patent: Aug. 7, 2018

(54) CONTEXT-AWARE APPLICATION STATUS INDICATORS

(71) Applicant: Jeong-Sook Lee, Heidelberg (DE)

(72) Inventor: Jeong-Sook Lee, Heidelberg (DE)

(73) Assignee: SAP SE, Walldorf (DE)

( * ) Notice: Subject to any disclaimer, the term of this patent is extended or adjusted under 35 U.S.C. 154(b) by 500 days.

(21) Appl. No.: 14/580,648

(22) Filed: Dec. 23, 2014

(65) Prior Publication Data

US 2016/0180567 A1 Jun. 23, 2016

(51) Int. Cl.
*G06F 3/048* (2013.01)
*G06F 3/041* (2006.01)
*G06F 3/00* (2006.01)
*G06F 3/0481* (2013.01)

(52) U.S. Cl.
CPC ............ *G06F 3/0481* (2013.01); *G06F 3/048* (2013.01)

(58) Field of Classification Search
CPC ... G06F 3/048; G06F 9/00; G06F 3/00; G06F 3/041
See application file for complete search history.

(56) References Cited

U.S. PATENT DOCUMENTS

| 5,640,522 | A * | 6/1997 | Warrin | G06F 3/0481 345/619 |
| 7,617,498 | B1 * | 11/2009 | Lumsden | G06F 9/52 707/999.1 |
| 8,797,330 | B1 * | 8/2014 | Haase | G06F 3/0481 345/473 |
| 2003/0154319 | A1 * | 8/2003 | Araki | G06F 9/46 719/310 |
| 2009/0150813 | A1 * | 6/2009 | Chang | G06F 3/0481 715/764 |
| 2010/0250782 | A1 * | 9/2010 | Pratt | G06Q 10/10 709/248 |
| 2010/0309149 | A1 * | 12/2010 | Blumenberg | G06F 3/04883 345/173 |
| 2010/0313159 | A1 * | 12/2010 | Decker | G06F 17/30899 715/772 |
| 2011/0087982 | A1 * | 4/2011 | McCann | G06F 3/0481 715/769 |
| 2011/0202936 | A1 * | 8/2011 | Todoroki | G06F 3/0481 719/329 |

(Continued)

*Primary Examiner* — Hugo Molina
(74) *Attorney, Agent, or Firm* — Fish & Richardson P.C.

(57) ABSTRACT

Systems, software, and computer-implemented methods for providing context-aware application status indicators are used to provide visual appearances and indications representing transitions between states in a software program. One example method includes displaying an animated image associated with a first state of a software program, the animated image having one or more attributes controlling a visual appearance of the displayed animated image; detecting a transition from the first state to a second state different than the first state by the software program; and in response to detecting the transition, updating one or more of the attributes of the displayed animated image to implement a change to the visual appearance of the displayed animated image, wherein the change to the visual appearance of the displayed animated image is associated with the transition from the first state to the second state.

9 Claims, 5 Drawing Sheets

(56) References Cited

U.S. PATENT DOCUMENTS

| | | | | |
|---|---|---|---|---|
| 2012/0182226 A1* | 7/2012 | Tuli | ................... | G06F 3/04883 345/173 |
| 2013/0036377 A1* | 2/2013 | Colley | ................. | G06F 3/0488 715/764 |
| 2014/0123021 A1* | 5/2014 | Walkin | ................. | G06F 9/4443 715/746 |
| 2015/0347181 A1* | 12/2015 | Myrick | .............. | G06F 9/44594 718/102 |
| 2015/0348512 A1* | 12/2015 | Sabatelli | ................. | G09G 5/37 345/629 |

* cited by examiner

CONTEXT-AWARE APPLICATION STATUS INDICATORS

BACKGROUND

The present disclosure involves systems, software, and computer-implemented methods for providing context-aware application status indicators.

Software applications generally include instructions that direct an executing processor to perform various operations. Software applications may display visual indicators to a user representing these operations or other information related to application execution.

SUMMARY

The present disclosure involves systems, software, and computer-implemented methods for providing context-aware application status indicators. In one general aspect, an example method includes displaying an animated image associated with a first state of a software program, the animated image having one or more attributes controlling a visual appearance of the displayed animated image; detecting a transition from the first state to a second state different than the first state by the software program; and in response to detecting the transition, updating one or more of the attributes of the displayed animated image to implement a change to the visual appearance of the displayed animated image, wherein the change to the visual appearance of the displayed animated image is associated with the transition from the first state to the second state.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Software applications may display status indicators via user interfaces to indicate a current operation being performed. These indicators may include loading animations, busy indicators, process indicators, or other types of indicators to communicate information about the application. Such indicators may not indicate the overall execution flow of a software application and may not take into account application context, such as a previous state of the application. The techniques described herein allow the display of context-dependent, context-aware animations indicating for a software application. By organizing the animations to display moving visual images according to a cycle based on the possible state transitions of an application, information regarding the current status of a program may be presented at a more granular level than with previous techniques. The state transition animations described herein may provide information on the current state of an application, as well as the previous state of the application. This additional context provides the user with more information regarding application execution.

One example method includes displaying an animated image associated with a first state of a software program. The animated image may have one or more attributes controlling its visual appearance, such as color, shape definitions, transparency, and other attributes. A transition from the first state to a second state different than the first state by the software program is then detected, such as by the receipt of an indication of the state transition from the software program. In response to detecting the transition, one or more attributes of the displayed animated image are updated to implement a change to the visual appearance of the displayed animated image. This implemented change to the visual appearance of the displayed animated image is associated with the transition of the software program from the first state to the second state.

Implementations according to the present disclosure may provide several advantages over prior techniques. The techniques may provide instructional cues and visual feedback on the flow of an application, which may allow a user to become more engaged in the application and increase user productivity. Greater variety in visual expression for an application may also be provided, while still maintaining consistent visual representations of state throughout the user interface. Further, the cyclic nature of the status indicators described herein may maintain a user's sense of momentum when performing tasks, again increasing productivity.

Figure 1:
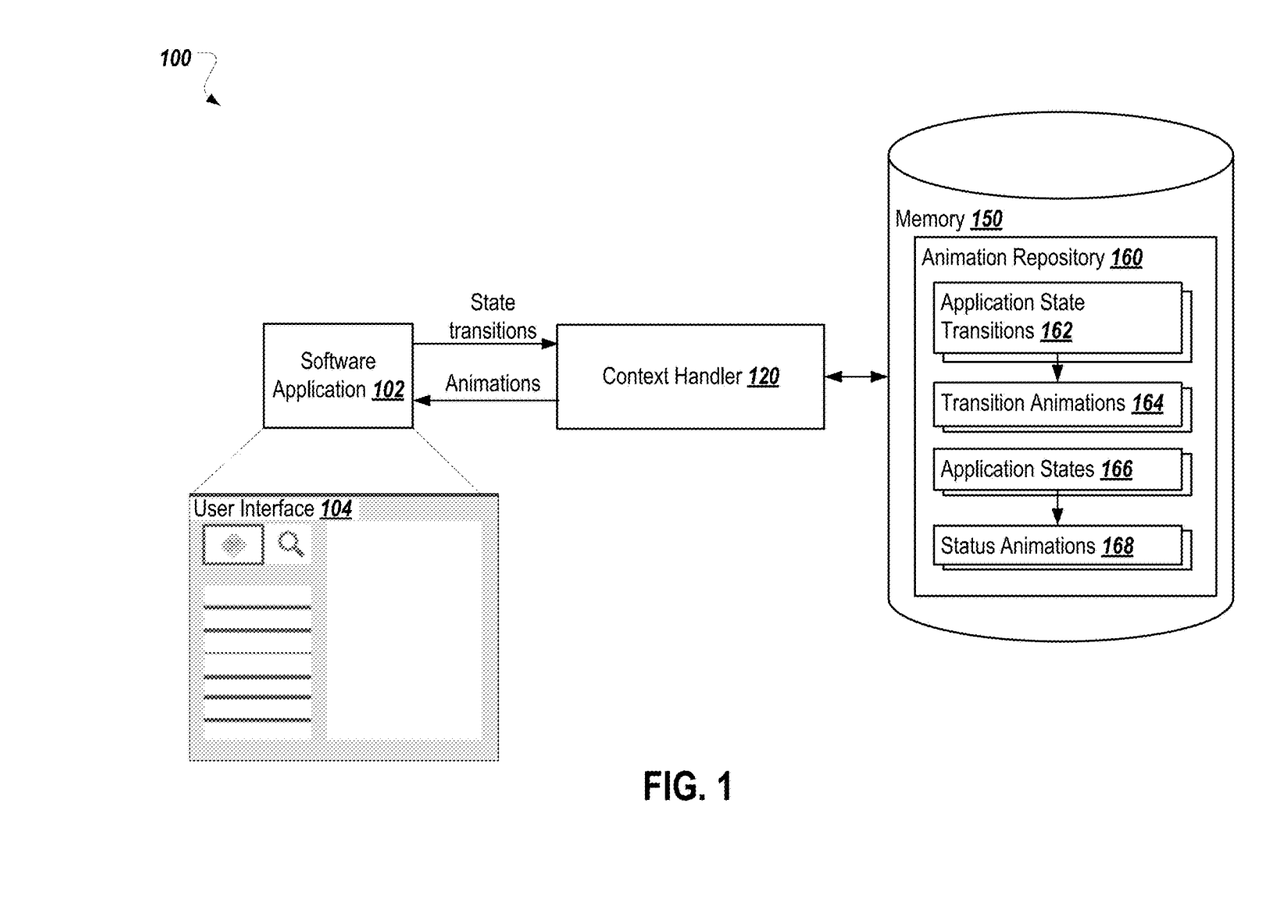
FIG. 1 is a block diagram illustrating an example environment for certifying applications for providing context-aware application status indicators.

FIG. 1 is a block diagram illustrating an example environment 100 for certifying applications for providing context-aware application status indicators. As shown, the environment 100 includes a software application 102, which includes a user interface 104. The software application 102 interacts with a context handler 120, which communicates for the memory 150. In operation, state transitions generated by the software application 102, such as changes in the current operation being performed by the software application 102, are communicated to the context handler 120. The context handler 120 retrieves animations 164 associated with state transitions 162 from an animation repository 160. The context handler 120 sends the particular animations 164 associated with the state transitions to the software application 102 for displaying the user interface 104.

The environment 100 includes software application 102. In some cases, the software application 102 may be an executable software program executed by one or more processors within a computing device. The software application 102 may perform operations in response to user input received by the user interface 104. In some cases, the software application 102 may cause the user interface 104 to be presented to a user on a display connected to a computing device executing the software application 102. The user interface 104 may receive input from the user via one or more user input devices, such as, for example, a mouse, keyboard, a touchscreen, or other input devices. In some implementations, the user interface 104 may be a webpage or other interface provided by the software application 102 to a remote computing device over a network.

Environment 100 also includes context handler 120. In operation, the context handler 120 receives state transitions from the software application 102 and provides a status animation corresponding to the particular state transition to the software application 102 for display in the user interface 104. In some implementations, the context handler 120 may be one or more software modules or libraries included in or referenced by the software application 102. The context handler 120 may also be executed by a computing device separate from the computing device executing the software application 102, and the state transitions and corresponding status animations may be communicated between the software application 102 and the context handler 120 over a network (not shown). In some implementations, the context handler 120 may receive state transitions and provide corresponding status animations to a plurality of software applications 102, such as, for example, in a case where the context handler 120 is implemented as a shared library referenced by multiple software applications 102.

Environment 100 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto. In some implementations, the software application 102, the context handler 120, and the memory 150 may be included in the same computing device.

The memory 150 includes the animation repository 160. In some implementations, the animation repository 160 may be a set of data structures stored in the memory 150. The animation repository may also be a file or set of files within a file system. In some cases, the animation repository 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products.

The animation repository 160 includes one or more status animations 168 associated with one or more application states 166. The application states 166 may correspond to states of the software application 102. For example, if the software application 102 is a data retrieval application, it may have an associated "retrieving data" application state indicating that the software application 102 is currently retrieving data, such as, for example, from a remote server. The application states 166 associated with the software application 102 may depend on the particular operations performed by the software application 102. In some cases, different software applications 102 may be associated with different sets of application states 166. Each software application 102 may have its own set of application states 166 stored in the animation repository 160 and its own set of status animations 168 associated with its application states 166.

The status animations 168 may be visual indicators for display in the user interface 104 to indicate that the software application 102 is in the application state 166 associated with the particular status animation 168. In some implementations, the status animations 168 may be animated image files or references to animated image files (e.g., filenames or Uniform Resource Locators (URLs)) stored in the animation repository 160. The animated image files may be formatted according to one or more formats for visual information, including, but not limited to, Graphics Interchange Format (GIF), Joint Picture Expert Group (JPEG) format, Hypertext Markup Language version 5 (HTML5), cascading style sheets, scripts, vector graphic formats, user interface objects, or other formats. The status animations may also be stored as parameters for status indicator display routine within the software application 102. For example, the status animation 168 may include a shape parameter with a value of "circle" to cause the software application 102 to display a circle. In some cases, the status animations 168 may include moving images or figures representing the associated application state 166, such as, for example, geometric shapes. The status animations 168 are described in greater detail relative to FIG. 3 below.

The animation repository 160 also includes one or more application state transitions 162 associated with one or more transition animations 164. The application state transitions 162 represent transitions of the software application 102 from a previous application state 166 to a new application state 166. For example, the software application 102, upon completion of the data retrieval operation in the application state "retrieving data", may transition to a new application state of "displaying data" when displaying the data in the user interface 104 to the user. The transition animations 164 are animated images to be displayed in response to an associated application state transition 162. The transition animations 164 may be formatted and organized in the same manner as the status animations 168 described above.

The context handler 120, in response to receiving a state transition from the software application 102, may query the animation repository 160 for a transition animation 164 associated with the particular application state transition 162. In some cases, the context handler 120 may also query the animation repository 160 for a status animation 168 associated with the new application state 166 indicated by the received state transition. The context handler 120 may then provide animation information associated with the received state transition to the software application 102. For example, the context handler 120 may provide the software application 102 with a transition animation 164 associated with the received state transition and may also provide the software application 102 with a status animation 168 associated with the new application state 166. In response, the software application 102 may display the transition animation 164 in the user interface 104. Once the transition animation 164 completes, the software application 102 may display the status animation 168 associated with the new application state 166 in the user interface 104. In some cases, the software application 102 may continue displaying the status animation 168 until another state transition occurs.

Figure 2:
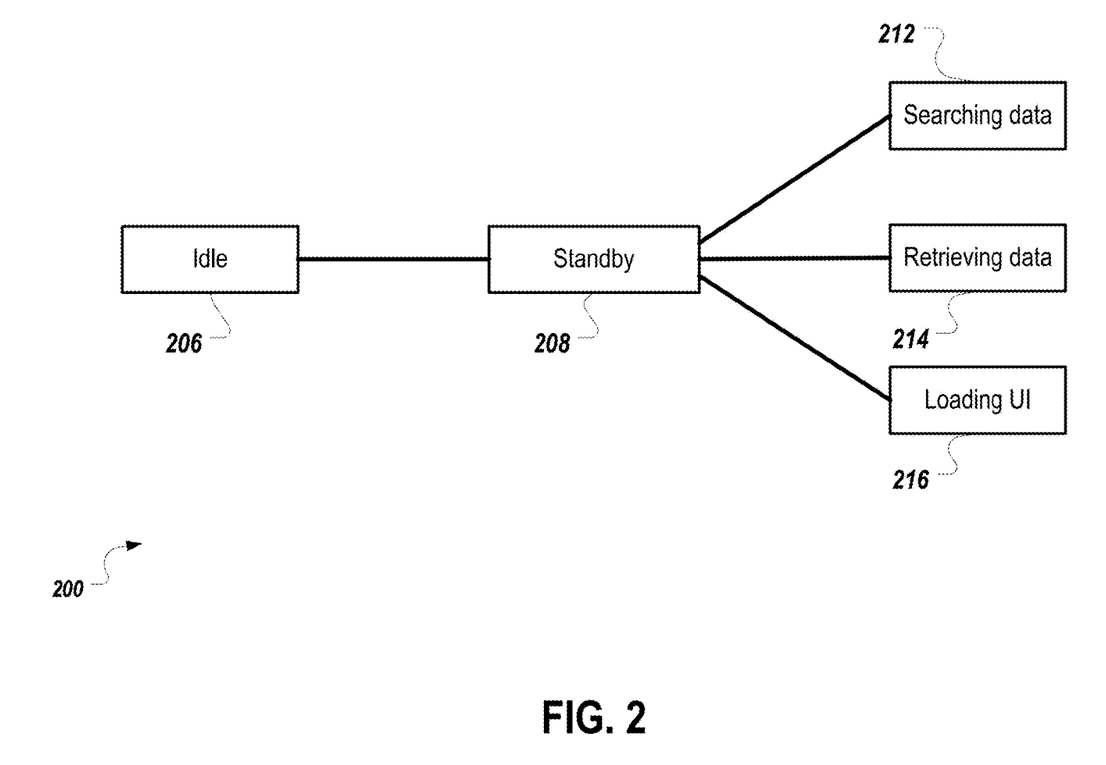
FIG. 2 is a block diagram illustrating an example set of states for an application.

FIG. 2 is a block diagram illustrating an example set of states 200 for an example software application. The set of states 200 includes an idle state 206, a standby state 208, a searching data state 212, a retrieving data state 214, and a loading user interface state 216. Each of these states may correspond to a particular operation performed by the example software application. As the states are provided for the purposes of explaining the retrieval and display of the application status indicators only, particular operations associated with each state will not be described.

Figure 3:
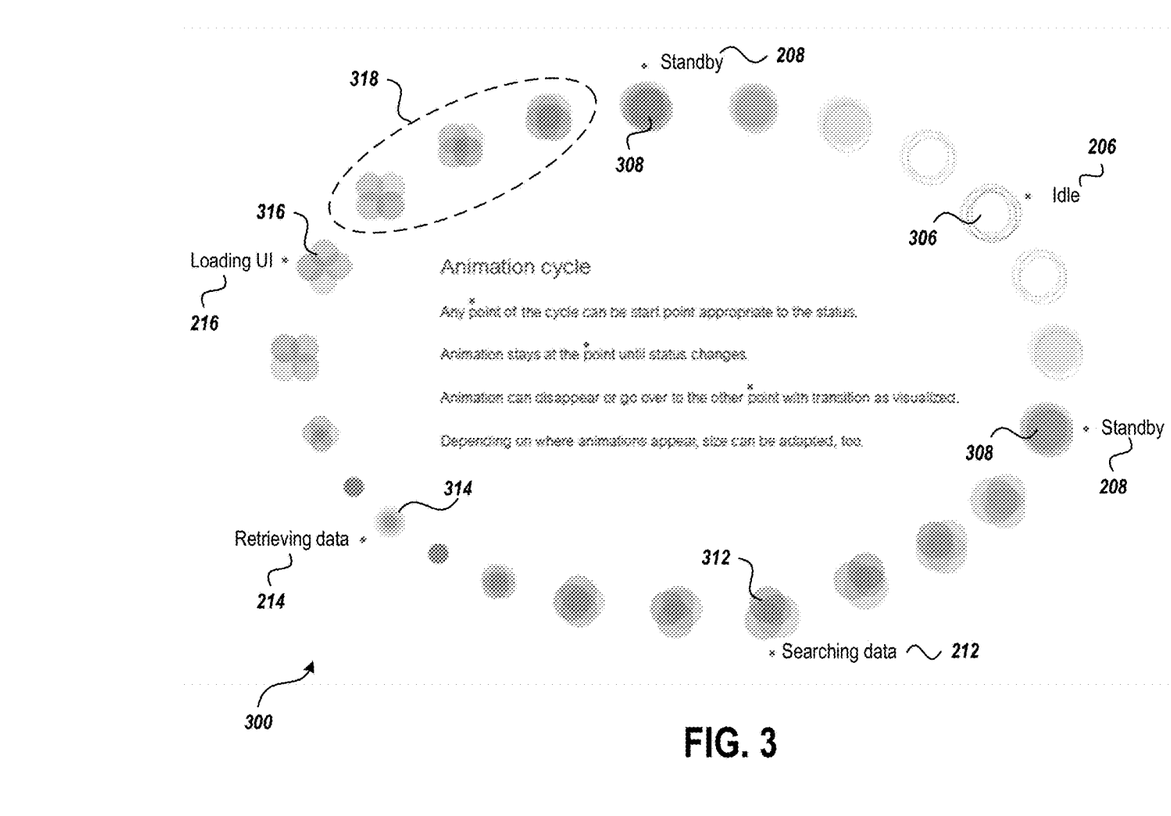
FIG. 3 is a diagram illustrating status indicators corresponding to the example set of states and transitions between the states.

FIG. 3 is a diagram illustrating a flow 300 of status indicators corresponding to the example set of states 200 and transitions between the states. Each state in the set of states 200 is associated with a particular status indicator. Transitions between the states are represented by the state transition animations (e.g., 318) between adjacent states. The standby state 208 is associated with the standby indicator 308. The idle state 206 is associated with the idle indicator 306. The searching data state 212 is associated with the searching data indicator 312. The retrieving data state 214 is associated with the retrieving data indicator 314. The loading user interface state 216 is associated with the loading user interface indicator 316. As previously described relative to FIG. 1, the status indicator associated with particular state may be displayed in a user interface to indicate that a software application is in the particular state.

State transition animations are shown connecting adjacent states. For example, the loading user interface state 216 is connected to the standby state 208 by the transition animation 318. In response to a software application transitioning from the loading user interface state 216 to the standby state 208, the software application may display the transition animation 318 in its user interface. The transition animations may provide a smooth visual transition between the status indicators for adjacent states. For example, the transition animation 318 changes the loading user interface state 216 by changing the size of each of the four circles in the loading user interface indicator 316 to make them larger and by changing the positions of the four circles such that they significantly overlap each other, as in standby indicator 308. The transition animations may gradually vary visual attributes of a previous state indicator to transform it into the new state indicator. The varied visual attributes may include, but are not limited to, number of shapes, color, size of shapes, motion, opacity, and other visual attributes.

Figure 4:
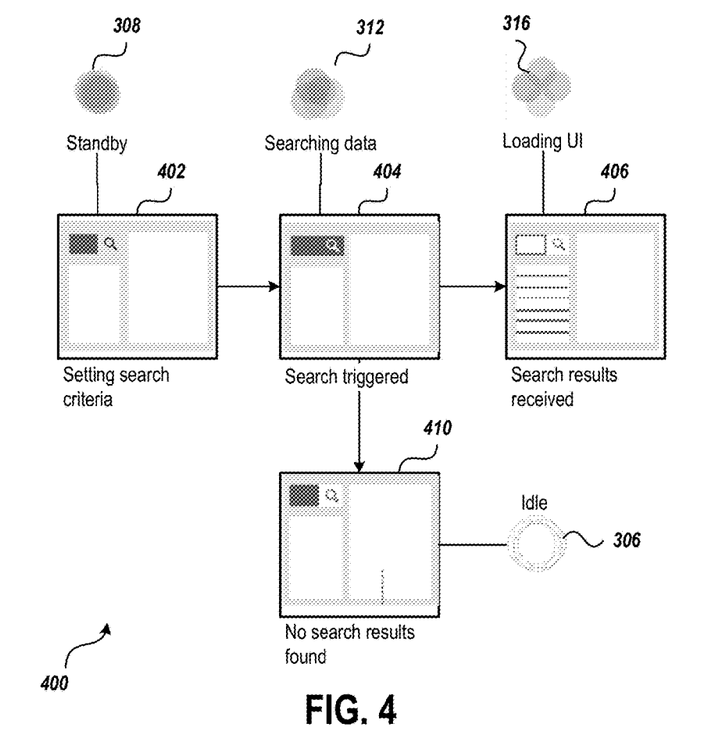
FIG. 4 is a flow diagram illustrating an example flow and corresponding status indicators.

FIG. 4 is a flow diagram illustrating an example application flow 400 and corresponding status indicators. At 402, search criteria are being set, such as, for example, in response to the user input. During this time, the application displays the standby indicator 308. At 404, the search is triggered in the application, such as by the user hitting a submit button. In response to this triggering, the application displays a state transition animation associated with the state change from standby to searching data and then displays the searching data indicator 312. At 406, the application receives search results and displays a corresponding state transition animation, followed by the loading user interface indicator 316 to indicate that the search results are being loaded into the user interface for display to the user. At 410, the application displays the screen indicating that no search results were found and displays the transition animation associated with the change from the searching data state to the idle state, followed by the idle indicator 306.

Figure 5:
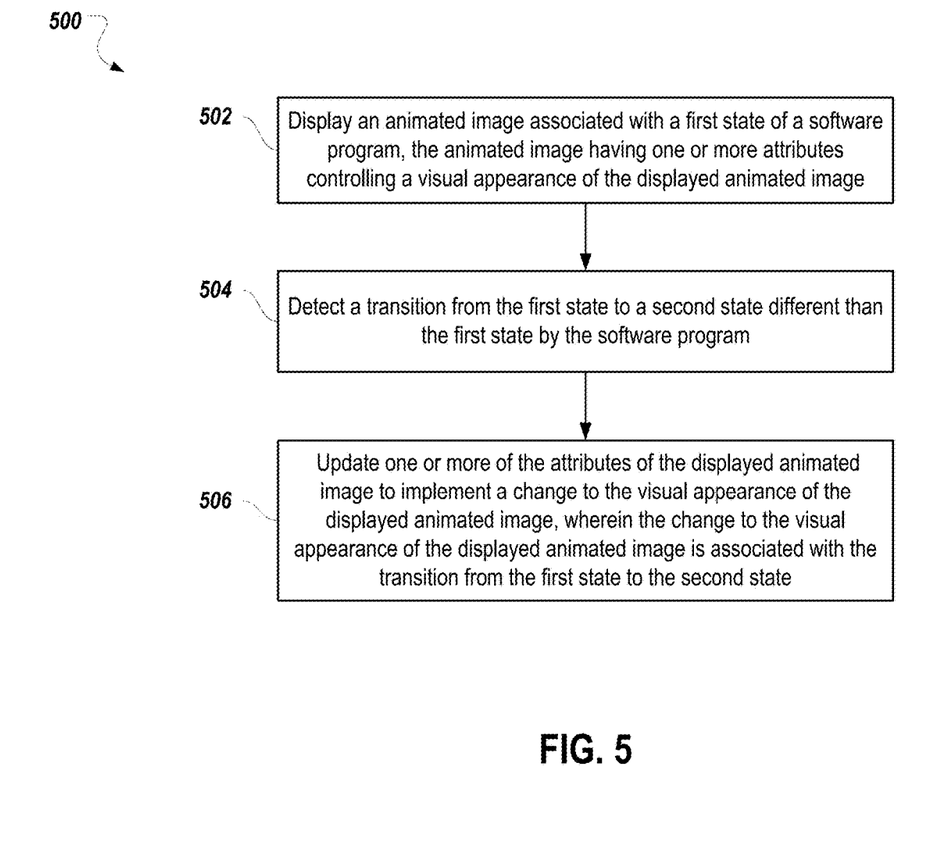
FIG. 5 is flow chart showing an example method for providing context-aware application status indicators.

FIG. 5 is flow chart showing an example method 500 for providing context-aware application status indicators. At 502, an animated image associated with the first state of a software program is displayed, the animated image having one or more attributes controlling a visual appearance of the displayed animated image. In some cases, the displayed animated image may include at least one of a cascading style sheet, an HTML5 file, a script file, a vector graphic, a user interface object, or other types of animated images.

At 504, a transition from the first state to a second state different than the first state by the software program is detected. In some cases, detecting the transition from the first state to the second state by the software program includes receiving an indication from the software program of the transition.

At 506, one or more of the attributes of the displayed animated image are updated to implement a change to the visual appearance of the displayed animated image. In some cases, the change to the visual appearance of the displayed animated images is associated with the transition from the first state to the second state. In some cases, the first state is associated with a first operation performed by the software program, the second state is associated with a second operation different than the first operation performed by the software program, and the transition from the first state to the second state corresponds to the software program stopping the first operation and beginning the second operation. The one or more attributes may include one or more of a number of figures displayed in the displayed animated image, a shape of each figure displayed in the displayed animated image, a size of each figure displayed in the displayed animated image, transparency of the displayed animated image, a color of each figure displayed in the displayed animated image, transparency of the displayed animated image, animation speed of the displayed animated image, a position of each figure displayed in the displayed animated image, or other attributes. In some cases, updating one or more of the attributes of the displayed animated image to implement the change to the visual appearance of the displayed animated image includes a continuous transition from a previous visual appearance represented by the one or more attributes before updating to a new visual appearance represented by the one or more updated attributes.

In some implementations, the transition is a first transition, the change to the visual appearance of the displayed animated image is a first change, and the method 500 includes detecting a second transition from the second state to a third state different than the second state by the software program; and in response to detecting the second transition, updating one or more of the attributes of the displayed animated image to implement a second change to the visual appearance of the displayed animated image, wherein the second change to the visual appearance of the displayed animated image is associated with the transition from the second state to the third state and is different than the first change.

The preceding figures and accompanying description illustrate example processes and computer-implementable techniques. Environment 100 (or its software or other components) contemplates using, implementing, or executing any suitable technique for performing these and other tasks. These processes are for illustration purposes only, and the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
   displaying, by the one or more processors, an animated image associated with a first state of a software program, the displayed animated image having one or more attributes controlling a visual appearance of the displayed animated image associated with the first state of the software program, and the first state of the software program is associated with a first operation performed by the software program, and wherein the displayed animated image comprises of at least one of a cascading style sheet, an HTML5 file, a script file, a vector graphic, or a user interface object;
   maintaining the displayed animated image having the one or more attributes controlling the visual appearance of the displayed animated image associated with the first state of the software program while the software program is performing the first operation of the software program;
   detecting, by the one or more processors, a transition by the software program from the first state of the software program to a second state of the software program different than the first state by receiving an indication of the transition from the software program, and wherein the second state of the software program is associated with a second operation performed by the software program different than the first operation performed by the software program;
   terminating, by the one or more processors, the first operation performed by the software program associated with the first state of the software program in response to detecting the transition by the software program from the first state of the software program to a second state of the software program;
   initiating, by the one or more processors, the second operation performed by the software program associated with the second state of the software program in response to detecting the transition by the software program from the first state of the software program to a second state of the software program;
   in response to detecting the transition by the software program, updating, by the one or more processors, the one or more attributes controlling the visual appearance of the displayed animated image to implement a change to the visual appearance of the displayed animated image associated with the transition by the software program from the first state of the software program to the second state of the software program;
   changing, by the one or more processors, the visual appearance of the displayed animated image based on a predefined continuous transition of a series of transitional animated images comprising of the displayed animated image associated with the first state of the software program, at least one transitional animated image and the displayed animated image associated with the second state of the software program, wherein the at least one transitional animated image comprises of a plurality of transitional animated images positioned at sequential locations between the displayed animated image associated with the first state of the software program and the displayed animated image associated with the second state of the software program; and
   in response to changing the visual appearance of the displayed animated image, displaying, by the one or more processors, the animated image associated with the second state of the software program, the displayed animated image having the updated one or more attributes controlling the visual appearance of the displayed animated image associated with the second state of the software program.

2. The method of claim 1, wherein the transition is a first transition, the change to the visual appearance of the displayed animated image is a first change, and the method further comprises:
   detecting a second transition from the second state to a third state different than the first state and the second state by the software program; and
   in response to detecting the second transition, updating one or more of the attributes of the displayed animated image to implement a second change to the visual appearance of the displayed animated image associated with the updated one or more attributes, wherein the second change to the visual appearance of the displayed animated image is associated with a second predefined transition of the updated one or more attributes associated with the second state to the updated one or more attributes associated with the third state and is different than the first change, wherein the second predefined transition of the one or more attributes associated with the first state to the one or more attributes associated with the second state is performed using a series of transitional animated images defined on a predefined continuum between the second state and the third state, at least one transitional animated image located between the second state and the third state, where the at least one transitional animated image is presented only during the predefined transition to the third state and wherein the at least one transitional animated image located between the second state and third state is different than the at least one transitional animated image located between the first state and the second state.

3. The method of claim 1, wherein the one or more attributes include one or more of a number of figures displayed in the displayed animated image, a shape of each figure displayed in the displayed animated image, a size of each figure displayed in the displayed animated image, transparency of the displayed animated image, a color of each figure displayed in the displayed animated image, transparency of the displayed animated image, animation speed of the displayed animated image, or a position of each figure displayed in the displayed animated image.

4. The method of claim 1, wherein a third state of the software program is associated with one or more attributes different than the one or more attributes associated with the first and second states, the third state associated with one or more attributes defined between the first state and second state on the predefined continuum, and where updating the one or more attributes of the animated image from the first state to the second state includes a predefined transition of the one or more attributes associated with the first state to the one or more attributes associated with the third state followed by a predefined transition of the one or more attributes of associated with the third state to the one or more attributes associated with the second state.

5. A non-transitory computer-readable medium storing instructions operable when executed to cause at least one processor to perform operations comprising:

displaying, by the at least one processor, an animated image associated with a first state of a software program, the displayed animated image having one or more attributes controlling a visual appearance of the displayed animated image associated with the first state of the software program, and the first state of the software program is associated with a first operation performed by the software program, and wherein the displayed animated image comprises of at least one of a cascading style sheet, an HTML5 file, a script file, a vector graphic, or a user interface object;

maintaining the displayed animated image having the one or more attributes controlling the visual appearance of the displayed animated image associated with the first state of the software program while the software program is performing the first operation of the software program;

detecting, by the at least one processor, a transition by the software program from the first state of the software program to a second state of the software program different than the first state by receiving an indication of the transition from the software program, and wherein the second state of the software program is associated with a second operation performed by the software program different than the first operation performed by the software program;

terminating, by the at least one processor, the first operation performed by the software program associated with the first state of the software program in response to detecting the transition by the software program from the first state of the software program to a second state of the software program;

initiating, by the at least one processor, the second operation performed by the software program associated with the second state of the software program in response to detecting the transition by the software program from the first state of the software program to a second state of the software program;

in response to detecting the transition by the software program, updating, by the at least one processor, the one or more attributes controlling the visual appearance of the displayed animated image to implement a change to the visual appearance of the displayed animated image associated with the transition by the software program from the first state of the software program to the second state of the software program;

changing, by the at least one processor, the visual appearance of the displayed animated image based on a predefined continuous transition of a series of transitional animated images comprising of the displayed animated image associated with the first state of the software program, at least one transitional animated image and the displayed animated image associated with the second state of the software program, wherein the at least one transitional animated image comprises of a plurality of transitional animated images positioned at sequential locations between the displayed animated image associated with the first state of the software program and the displayed animated image associated with the second state of the software program; and in response to changing the visual appearance of the displayed animated image, displaying, by the at least one processor, the animated image associated with the second state of the software program, the displayed animated image having the updated one or more attributes controlling the visual appearance of the displayed animated image associated with the second state of the software program.

6. The non-transitory computer-readable medium of claim 4, wherein the transition is a first transition, the change to the visual appearance of the displayed animated image is a first change, and the operations further comprise:

detecting a second transition from the second state to a third state different than the first state and the second state by the software program; and in response to detecting the second transition, updating one or more of the attributes of the displayed animated image to implement a second change to the visual appearance of the displayed animated image associated with the updated one or more attributes, wherein the second change to the visual appearance of the displayed animated image is associated with a second predefined transition of the updated one or more attributes associated with the second state to the updated one or more attributes associated with the third state and is different than the first change, wherein the second predefined transition of the one or more attributes associated with the first state to the one or more attributes associated with the second state is performed using a series of transitional animated images defined on a predefined continuum between the second state and the third state, at least one transitional animated image located between the second state and the third state, where the at least one transitional animated image is presented only during the predefined transition to the third state and wherein the at least one transitional animated image located between the second state and third state is different than the at least one transitional animated image located between the first state and the second state.

7. The non-transitory computer-readable medium of claim 4, wherein the one or more attributes include one or more of a number of figures displayed in the displayed animated image, a shape of each figure displayed in the displayed animated image, a size of each figure displayed in the displayed animated image, transparency of the displayed animated image, a color of each figure displayed in the displayed animated image, transparency of the displayed animated image, animation speed of the displayed animated image, or a position of each figure displayed in the displayed animated image.

8. A system comprising:
memory for storing data;
one or more processors operable to perform operations comprising:

displaying, by the one or more processors, an animated image associated with a first state of a software program, the displayed animated image having one or more attributes controlling a visual appearance of the displayed animated image associated with the first state of the software program, and the first state of the software program is associated with a first operation performed by the software program, and wherein the displayed animated image comprises of at least one of a cascading style sheet, an HTML5 file, a script file, a vector graphic, or a user interface object;

maintaining the displayed animated image having the one or more attributes controlling the visual appearance of the displayed animated image associated with the first state of the software program while the software program is performing the first operation of the software program;

detecting, by the one or more processors, a transition by the software program from the first state of the software program to a second state of the software program different than the first state by receiving an indication of the transition from the software program, and wherein the second state of the software program is associated with a second operation performed by the software program different than the first operation performed by the software program;

terminating, by the one or more processors, the first operation performed by the software program associated with the first state of the software program in response to detecting the transition by the software program from the first state of the software program to a second state of the software program;

initiating, by the one or more processors, the second operation performed by the software program associated with the second state of the software program in response to detecting the transition by the software program from the first state of the software program to a second state of the software program;

in response to detecting the transition by the software program, updating, by the one or more processors, the one or more attributes controlling the visual appearance of the displayed animated image to implement a change to the visual appearance of the displayed animated image associated with the transition by the software program from the first state of the software program to the second state of the software program;

changing, by the one or more processors, the visual appearance of the displayed animated image based on a predefined continuous transition of a series of transitional animated images comprising of the displayed animated image associated with the first state of the software program, at least one transitional animated image and the displayed animated image associated with the second state of the software program, wherein the at least one transitional animated image comprises of a plurality of transitional animated images positioned at sequential locations between the displayed animated image associated with the first state of the software program and the displayed animated image associated with the second state of the software program; and in response to changing the visual appearance of the displayed animated image, displaying, by the one or more processors, the animated image associated with the second state of the software program, the displayed animated image having the updated one or more attributes controlling the visual appearance of the displayed animated image associated with the second state of the software program.

9. The system of claim 8, wherein the transition is a first transition, the change to the visual appearance of the displayed animated image is a first change, and the operations further comprise:

detecting a second transition from the second state to a third state different than the first state and the second state by the software program; and in response to detecting the second transition, updating one or more of the attributes of the displayed animated image to implement a second change to the visual appearance of the displayed animated image associated with the updated one or more attributes, wherein the second change to the visual appearance of the displayed animated image is associated with a second predefined transition of the updated one or more attributes associated with the second state to the updated one or more attributes associated with the third state and is different than the first change, wherein the second predefined transition of the one or more attributes associated with the first state to the one or more attributes associated with the second state is performed using a series of transitional animated images defined on a predefined continuum between the second state and the third state, at least one transitional animated image located between the second state and the third state, where the at least one transitional animated image is presented only during the predefined transition to the third state and wherein the at least one transitional animated image located between the second state and third state is different than the at least one transitional animated image located between the first state and the second state.

* * * * *